(12) United States Patent
Lee et al.

(10) Patent No.: US 11,235,811 B2
(45) Date of Patent: Feb. 1, 2022

(54) SIDE SILL RIGIDITY REINFORCEMENT STRUCTURE OF VEHICLE AND METHOD OF MANUFACTURING THE SAME

(71) Applicants: Hyundai Motor Company, Seoul (KR); Kia Motors Corporation, Seoul (KR)

(72) Inventors: Jin-Sung Lee, Seoul (KR); Dae-Myoung Park, Suwon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 6 days.

(21) Appl. No.: 16/843,433

(22) Filed: Apr. 8, 2020

(65) Prior Publication Data

US 2021/0179180 A1 Jun. 17, 2021

(30) Foreign Application Priority Data

Dec. 13, 2019 (KR) .......................... 10-2019-0167157

(51) Int. Cl.
  *B62D 25/02* (2006.01)
  *B62D 21/15* (2006.01)
  *B62D 27/02* (2006.01)
  *B62D 25/04* (2006.01)
(52) U.S. Cl.
  CPC .......... *B62D 25/025* (2013.01); *B62D 25/04* (2013.01); *B62D 27/026* (2013.01); *B62D 21/157* (2013.01)

(58) Field of Classification Search
  CPC ..... B62D 25/025; B62D 25/04; B62D 21/157
  USPC ............................................ 296/209, 193.06
  See application file for complete search history.

(56) References Cited

U.S. PATENT DOCUMENTS

| 9,381,952 | B2 * | 7/2016 | Furusaki | ................ | B62D 25/16 |
| 9,505,442 | B2 * | 11/2016 | Wu | .......................... | B60K 1/04 |
| 2019/0359260 | A1 * | 11/2019 | Tsuyuzaki | .............. | B60R 16/04 |

FOREIGN PATENT DOCUMENTS

KR   10-2019-0052207 A   5/2019

\* cited by examiner

*Primary Examiner* — Dennis H Pedder
(74) *Attorney, Agent, or Firm* — Morgan, Lewis & Bockius LLP

(57) ABSTRACT

A side sill rigidity reinforcement structure of a vehicle may include an external side sill external member which includes an upper support portion and a lower support portion each having a section convexly formed outwardly from a vehicle and mounted vertically, is formed to connect the upper support portion and the lower support portion; an internal side sill external member which is mounted inside any one of the upper support portion and the lower support portion; a side sill external panel which is bonded outside the external side sill external member; and a side sill internal panel which has an upper portion and a lower portion bonded to the side sill external panel.

17 Claims, 18 Drawing Sheets

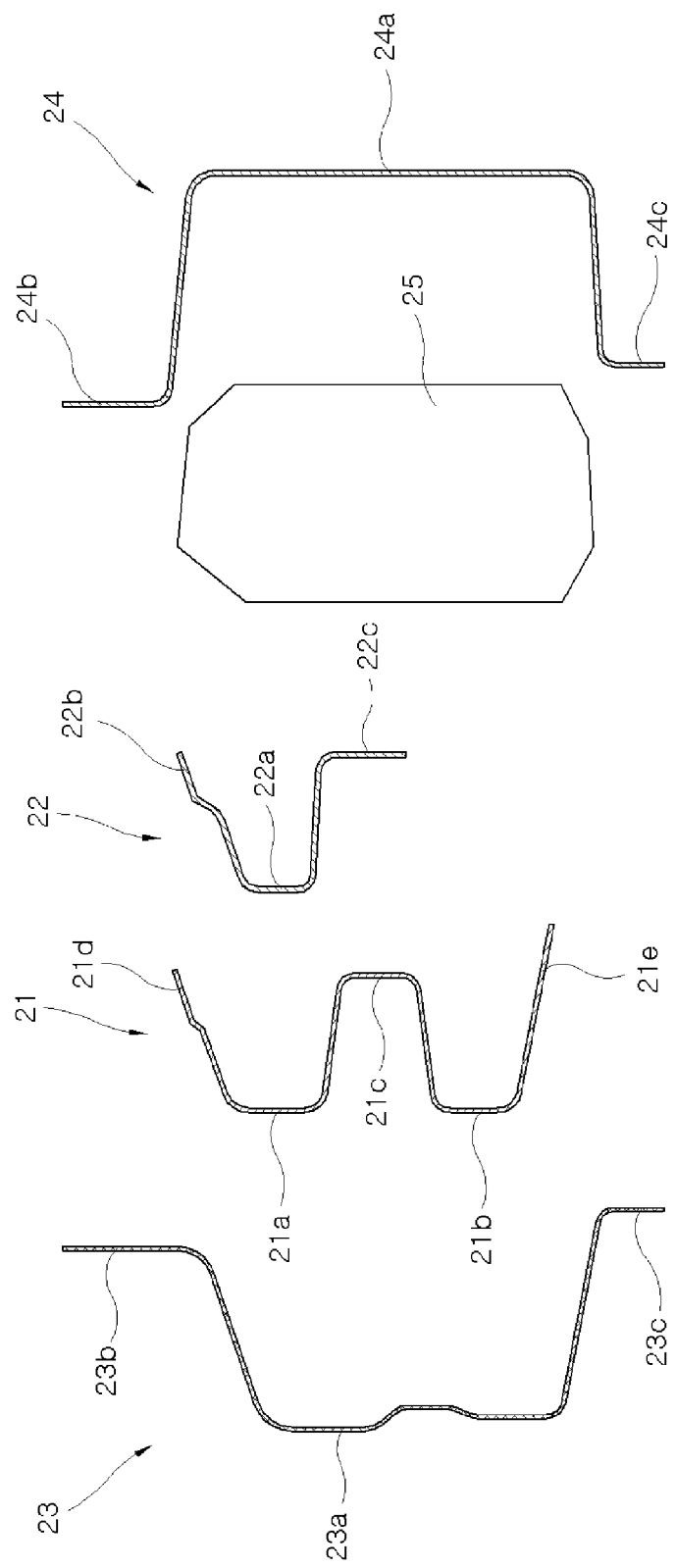

SIDE SILL RIGIDITY REINFORCEMENT STRUCTURE OF VEHICLE AND METHOD OF MANUFACTURING THE SAME

CROSS-REFERENCE TO RELATED APPLICATION

The present application claims priority to Korean Patent Application No. 10-2019-0167157, filed on Dec. 13, 2019, the entire contents of which is incorporated herein for all purposes by this reference.

BACKGROUND OF THE PRESENT INVENTION

Field of the Invention

The present invention relates to a side sill rigidity reinforcement structure of a vehicle and a method of manufacturing the same, which prevent a battery from being damaged at the side collision in a vehicle provided with the battery, and facilitate buckling at collision in the front and rear direction thereof.

Description of Related Art

Eco-friendly vehicles, such as an electric vehicle and a hybrid vehicle, are provided with a battery for supplying power to a driving motor.

To maximally secure a space capable of loading the battery inside the vehicle, a space such as a portion below a seat of the vehicle is utilized maximally.

FIG. 1 shows a configuration in which a battery (BAT) has been provided in a lower portion of a vehicle, and FIG. 2 shows a vehicle body structure for equipping the battery (BAT).

The lower portion of the vehicle is formed with a structure by an underbody 111, a center floor panel 121, a seat cross member 122, and the like, and to secure a space (S) for mounting the battery (BAT), the structure is not applied to the middle portion of the underbody 111.

Meanwhile, it is regulated by a law to prevent the battery (BAT) from being damaged at the side collision. To this end, a reinforcing material for preventing the battery (BAT) from being damaged at the side collision is provided on the side surface of the vehicle, below the side surface thereof.

For example, by mounting a side sill reinforcement member 131 at the side sill side of the vehicle, it is possible to prevent the battery (BAT) from being damaged at the side collision of the vehicle.

The side sill reinforcement member 131 has a shape as shown in FIG. 3 and FIG. 4. The side sill reinforcement member 131 includes aluminum alloy, and is manufactured by extrusion.

The side sill reinforcement member 131 is fastened to a bracket 132, made of a steel material, by use of a rivet 133, and the bracket 132 is welded (W) to a side sill external panel 123 and a side sill internal panel 124, and thus the side sill reinforcement member 131 is mounted.

The section of a site where the side sill reinforcement member 131 has been mounted has no structure in which the side sill reinforcement member 131 is bonded or fastened to another structure other than the bracket 132, for example, the side sill internal panel 124 or the side sill external panel 123 (see FIG. 5). Since this is a factor of lowering the strength at collision, there is concern that the battery (BAT) is damaged by the collision.

The side sill reinforcement member 131 is fastened to the bracket 132 through the rivet 133, and the bracket 132 is connected again to the side sill internal panel 124 and the side sill external panel 123, such that the number of places where different materials need to be bonded is excessive, which may be inevitably disadvantageous in a quality control, resulting in an increase in cost.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a side sill rigidity reinforcement structure of a vehicle and a method of manufacturing the same, which ca reinforce the rigidity against the side collision of the vehicle, protecting a battery provided in an eco-friendly vehicle from the side collision.

Meanwhile, various aspects of the present invention are directed to providing a side sill rigidity reinforcement structure of a vehicle and a method of manufacturing the same, which facilitate buckling at collision in the front and rear direction to be configured to respond to the small overlap.

A side sill rigidity reinforcement structure of a vehicle according to an exemplary embodiment of the present invention for achieving the objects includes: an external side sill external member which includes an upper support portion and a lower support portion each having a section convexly formed outwardly from a vehicle and mounted vertically, and formed to connect the upper support portion and the lower support portion; an internal side sill external member which is mounted inside any one of the upper support portion and the lower support portion; a side sill external panel which is bonded to the outside of the external side sill external member; and a side sill internal panel which has an upper portion and a lower portion bonded to the side sill external panel.

The external side sill external member further includes a connecting portion which connects the upper support portion and the lower support portion and is convexly formed inwardly from the vehicle.

The internal side sill external member includes a reinforcement portion which is convexly formed outwardly from the vehicle and bonded to the upper support portion, a lower bonding portion which extends downwardly from the reinforcement portion and is bonded to the connecting portion, and an upper bonding portion which extends upwards from the reinforcement portion and is bonded to the external side sill external member and the side sill external panel at the same time.

The internal side sill external member includes a reinforcement portion which is convexly formed outwardly from the vehicle and is bonded to the lower support portion, an upper bonding portion which extends upwards from the reinforcement portion and is bonded to the connecting portion, and a lower bonding portion which extends downwardly from the reinforcement portion and is bonded to the external side sill external member and the side sill external panel at the same time.

A site, bonded to the connecting portion, in the internal side sill external member extends vertically, and covers the connecting portion.

The internal side sill external member is made of a material having a tensile strength lower than a tensile strength of the external side sill external member, and the external side sill external member and the internal side sill external member are manufactured by roll forming.

A bulkhead, which supports the side sill internal panel, is bonded to the interior of the side sill internal panel.

The internal side sill external member is formed longer than the external side sill external member, and the front end portion of the internal side sill external member is located closer to the front of the vehicle than the front end portion of the external side sill external member.

The internal side sill external member is bonded to the external side sill external member behind a site extending downwardly from a front pillar of the vehicle.

The front end portion of the internal side sill external member is located at substantially the same site as the front end portion of the side sill external panel, and the front end portion of the internal side sill external member is located to be spaced from the front end portion of the front pillar of the vehicle.

Meanwhile, in a side sill rigidity reinforcement structure of a vehicle, which reinforces the rigidity of a side sill mounted in the longitudinal direction of the vehicle below the side surface of the vehicle, the side sill has a strength which becomes higher from the front of the vehicle toward the rear of the vehicle.

A first site where a lower end portion of a front pillar and the side sill are bonded, a second site which is located behind the first site, and a third site which is located behind the second site and forms the side sill are formed sequentially in the longitudinal direction of the vehicle, the first site, the second site, and the third site have different sectional structures to have the required rigidity, and the strength increases from the first site toward the third site.

The first site has a side sill front reinforcement member which is formed at the lower end portion of the front pillar and has the section convexly bent outwardly from the vehicle.

The second site has a front end portion of a side sill external panel bonded to the inside below the front pillar, the side sill front reinforcement member bonded to the inside of the side sill external panel, and an internal side sill external member bonded to the inside of the side sill front reinforcement member.

The internal side sill external member includes a reinforcement portion which is convexly formed outwardly from the vehicle in the internal side sill external member and bonded to a site, formed in the height direction of the vehicle, in the side sill front reinforcement member, and an upper bonding portion which extends upwards from the reinforcement portion in the internal side sill external member and is bonded to an upper portion of the side sill front reinforcement member.

The third site has an external side sill external member which is bonded to the inside of a side sill external panel for forming an appearance of the side sill, and the internal side sill external member which contacts the inside of the external side sill external member.

The external side sill external member includes an upper support portion and a lower support portion which each have the section convexly formed outwardly from the vehicle, and are disposed vertically, and a connecting portion which connects the upper support portion and the lower support portion and is convexly formed inwardly from the vehicle.

The internal side sill external member includes a reinforcement portion which is convexly formed outwardly from the vehicle and bonded to the upper support portion, and a lower bonding portion which extends downwardly from the reinforcement portion and is bonded to the connecting portion.

The rear end portion of the side sill front reinforcement member is located at the same location as the front end portion of the external side sill external member.

A method of manufacturing a side sill rigidity reinforcement structure of a vehicle according to an exemplary embodiment of the present invention includes: bonding a side sill external member which bonds an internal side sill external member to the inside of an external side sill external member; bonding a side sill external panel to the outside of an assembly in which the external side sill external member and the internal side sill external member have been bonded; and bonding a side sill internal panel, bonded to a bulkhead, to the side sill external panel.

According to the side sill rigidity reinforcement structure of the vehicle and the method of manufacturing the same according to an exemplary embodiment of the present invention having the above configuration, it is possible to strengthen the basic rigidity of the side sill, minimizing the deformation in the side sill at the side collision to prevent the battery provided inside the vehicle from being damaged.

Furthermore, since the site where the side sill is bonded to the front pillar has relatively low rigidity, the site where the front pillar and the side sill are bonded may be easily buckled at the side collision or at the head-on collision. Since the site where the front pillar and the side sill are bonded is easily buckled, the collision force generated at collision is exhausted by the buckling, preventing the battery from being damaged.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7B is an exploded diagram of FIG. 7A.

Figure 1:
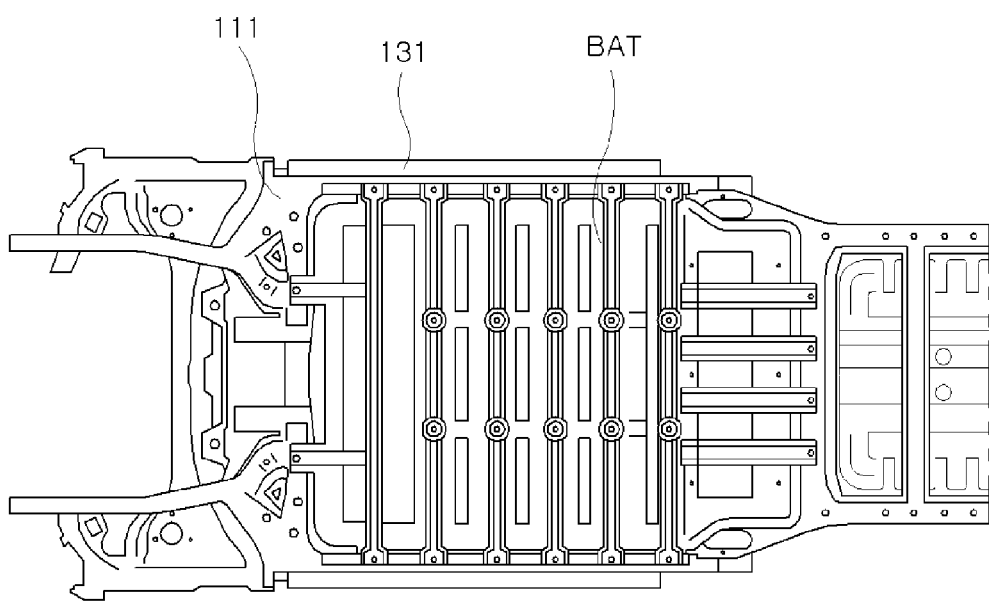
FIG. 1 is a schematic diagram showing a state where a battery has been provided in an eco-friendly vehicle to which a side reinforcement structure of a vehicle according to the related art has been applied.
Figure 2:
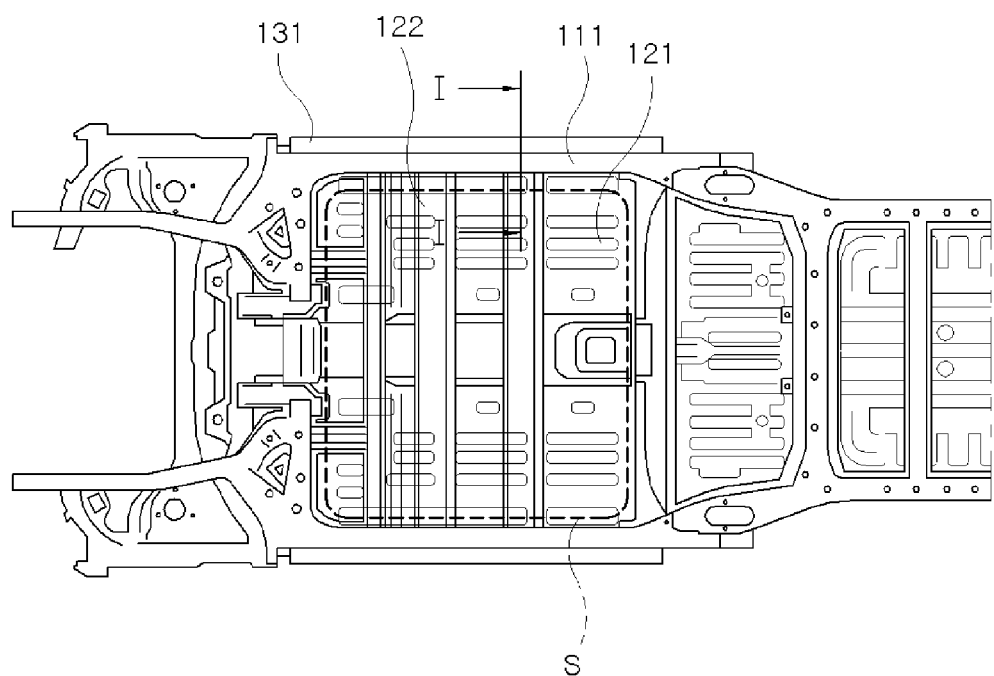
FIG. 2 is a plan diagram showing the side reinforcement structure of the vehicle according to the related art.
Figure 3:
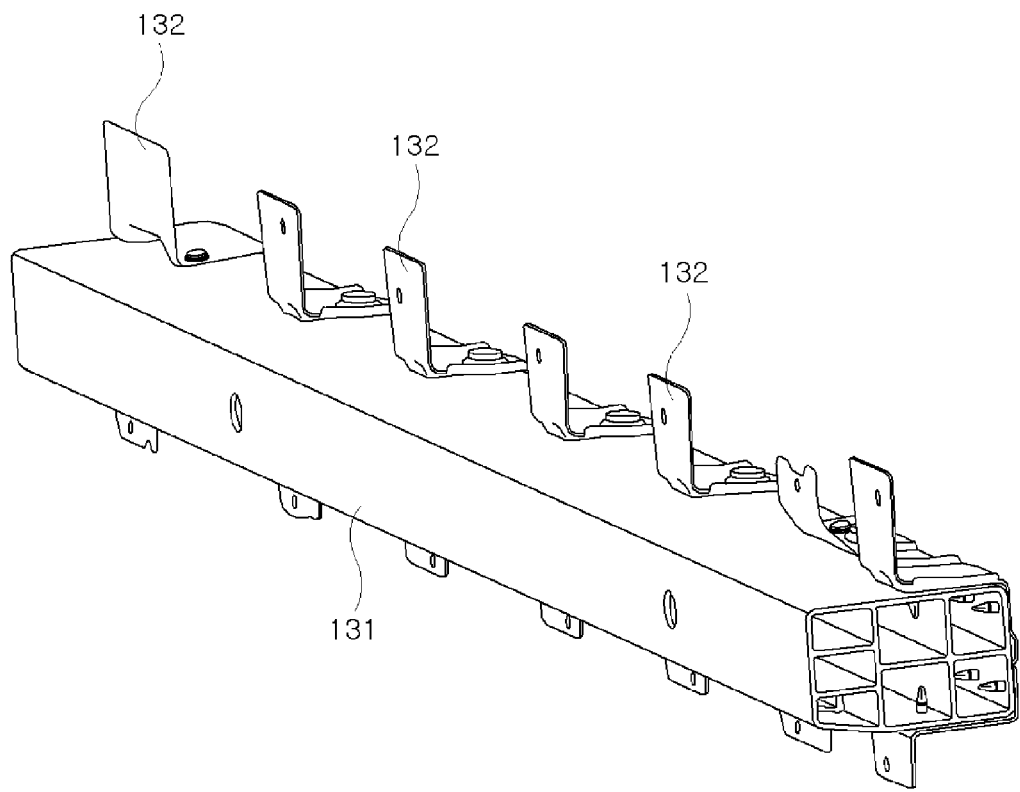
FIG. 3 is a perspective diagram showing a state where a bracket has been fastened to a side sill reinforcement member for reinforcing the side rigidity of the vehicle in the related art.
Figure 4:
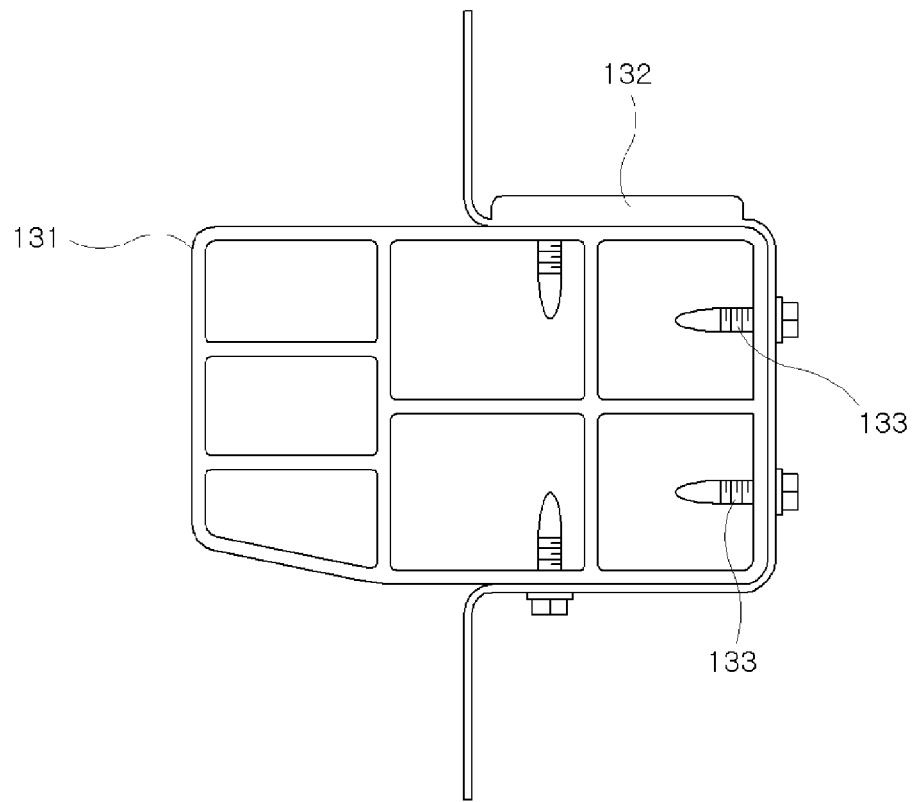
FIG. 4 is a front diagram of the side sill reinforcement member applied to the related art.
Figure 5:
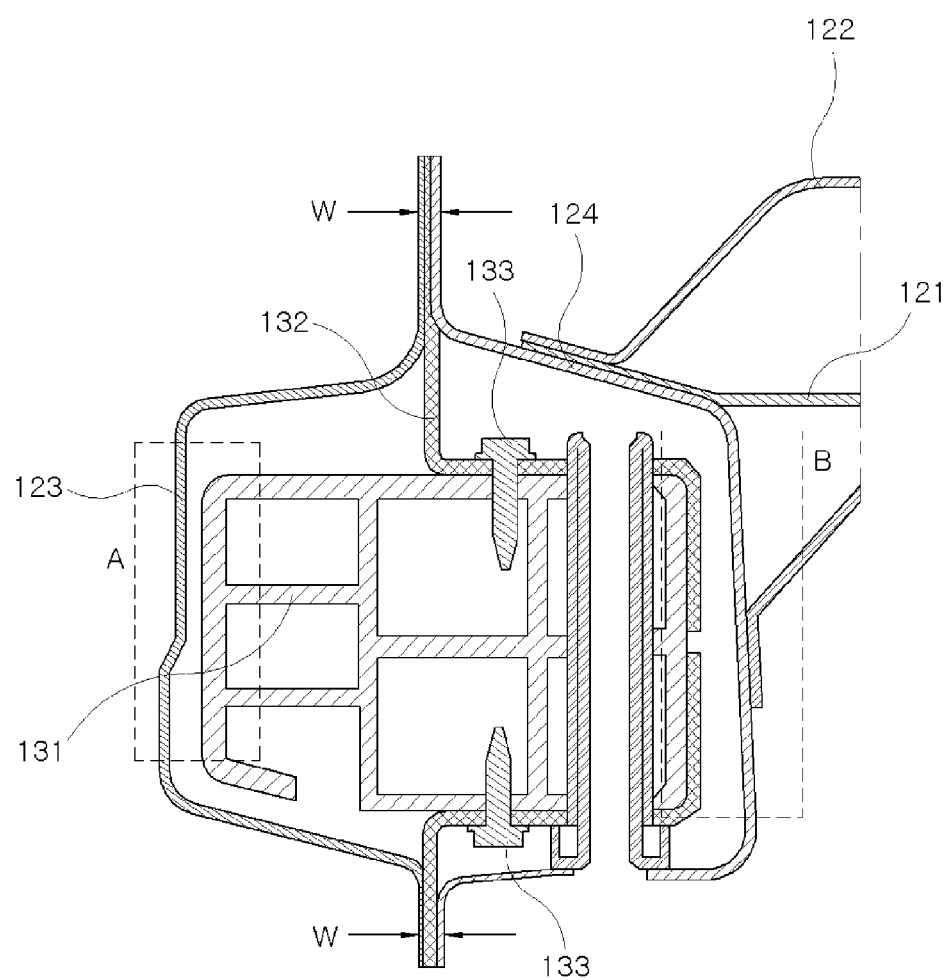
FIG. 5 is a cross-sectional diagram taken along line I-I of FIG. 2.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other h, and the invention(s) is/are intended to cover not only the exemplary embodiments of the present invention, but also various alternatives, modifications, equivalents and other embodiments, which may be included within the spirit and scope of the invention as defined by the appended claims.

Hereinafter, a side sill rigidity reinforcement structure of a vehicle according to an exemplary embodiment of the present invention will be described in detail with reference to the accompanying drawings.

The side sill rigidity reinforcement structure of a vehicle according to an exemplary embodiment of the present invention includes an external side sill external member 21 which includes an upper support portion 21a and a lower support portion 21b having the section convexly formed outwardly from the vehicle and disposed vertically, and is formed to connect the upper support portion 21a and the lower support portion 21b, an internal side sill external member 22 which is mounted inside any one of the upper support portion 21a and the lower support portion 21b, a side sill external panel 23 which is bonded to the outside of the external side sill external member 21, and a side sill internal panel 24 which has an upper portion and a lower portion bonded to the side sill external panel 23.

The external side sill external member 21 is provided inside a side sill 13 of the vehicle, reinforcing the rigidity of the side sill.

The external side sill external member 21 includes the upper support portion 21a and the lower support portion 21b disposed vertically. Referring to the section of the external side sill external member 21, the upper support portion 21a and the lower support portion 21b protrude outwardly from the vehicle.

The upper support portion 21a and the lower support portion 21b are connected by a connecting portion 21c. The connecting portion 21c protrudes inwardly from the vehicle.

Since the upper support portion 21a and the lower support portion 21b protrude outward, and the connecting portion 21c protrudes inwardly from the vehicle, the external side sill external member 21 has a W shape rotated by 90 degrees.

Since the external side sill external member 21 has the section having a double convex structure by the upper support portion 21a and the lower support portion 21b, the strength against the side collision is improved.

Furthermore, the external side sill external member 21 is bonded to the interior of the side sill external panel 23, and to be configured to easily bond the external side sill external member 21 to the side sill external panel 23, an upper bonding portion 21d extends upwards from the upper support portion 21a, and a lower bonding portion 21e extends downwardly from the lower support portion 21b. The upper bonding portion 21d and the lower bonding portion 21e allow the external side sill external member 21 and the side sill external panel 23 to be in surface-contact with each other when bonded to the side sill external panel 23.

Since the external side sill external member 21 has roll-formed a high-tensile-strength steel sheet so that the section thereof becomes a rotated W shape, the rigidity against the side collision is improved. Here, as the external side sill external member 21, a high-tensile-strength steel sheet of 150K class may be applied.

The internal side sill external member 22 is mounted inside the external side sill external member 21.

Referring to the section of the internal side sill external member 22, the internal side sill external member 22 includes a reinforcement portion 22a which protrudes outwardly from the vehicle, a lower bonding portion 22c which extends from the lower end portion of the reinforcement portion 22a toward the connecting portion 21c of the external side sill external member 21, and an upper bonding portion 22b which extends from the upper end portion of the reinforcement portion 22a.

The reinforcement portion 22a is located inside the upper support portion 21a, and the reinforcement portion 22a is bonded to the upper support portion 21a by welding (W).

The lower bonding portion 22c extends downwardly in the vertical direction from the lower end portion of the reinforcement portion 22a, and the lower bonding portion 22c is bonded to the connecting portion 21c of the external side sill external member 21 by welding (W).

The upper bonding portion 22b extends obliquely from the upper end portion of the reinforcement portion 22a. The upper bonding portion 22b is welded together when the external side sill external member 21 is welded to the side sill external panel 23.

The inside of the side sill external panel 23 becomes a state where the internal side sill external member 22 has overlapped with the upper portion of the external side sill external member 21.

Meanwhile, the internal side sill external member 22 may also be located at the lower support portion 21b of the external side sill external member 21. That is, the reinforcement portion 22a of the internal side sill external member 22 is located inside the lower support portion 21b of the external side sill external member 21, an upper bonding portion 23b is formed, which extends to the upper end portion of the reinforcement portion 22a and is bonded to the connecting portion 21c, and a lower bonding portion 23c is formed, which extends to the lower end portion of the reinforcement portion 22a and is bonded to the lower bonding portion 21e of the external side sill external member 21, such that the external side sill external member 21 and the side sill external panel 23 may also be welded together.

The internal side sill external member 22 also roll-forms a high-tensile-strength steel sheet so that the section thereof becomes a rotated U shape, improving the rigidity against the side collision together with the external side sill external member 21. Here, as the internal side sill external member 22, a high-tensile-strength steel sheet of 120K class is applied, which has a tensile force slightly lower force than the external side sill external member 21.

Furthermore, the internal side sill external member 22 is formed longer than the external side sill external member 21. The side sill rigidity reinforcement structure of the vehicle according to an exemplary embodiment of the present invention has a structure in which the rigidity of the side sill increases at the side collision, preventing the battery stored therein from being damaged, and the front thereof is easily buckled to absorb the impact force. To this end, the internal side sill external member 22 is bonded to the lower portion of a front pillar 12 of the vehicle, but the external side sill external member 21 is not bonded to the front pillar 12.

Accordingly, the internal side sill external member 22 protrudes further than the front end portion of the external side sill external member 21, and is bonded to the lower portion of the front pillar 12.

The internal side sill external member 22 does not have substantially the same shape as the external side sill external member 21, and has a smaller size than the external side sill external member 21. In the case of simply stacking plate materials having the same shape, the brittleness tendency is more remarkable than the tensile tendency at collision. However, the internal side sill external member 22 is formed smaller in size than the external side sill external member 21, improving the tensile force at collision.

The side sill external panel 23 is formed inside a site exposed to the appearance of the side sill 13, the outside of the vehicle. The side sill external panel 23 includes a panel portion 23a which is formed substantially in the height direction of the vehicle, and the upper bonding portion 23b and the lower bonding portion 23c which extend to the upper end portion and the lower end portion of the panel portion 23a, respectively. The panel portion 23a has a shape convexly protruding outwardly from the vehicle so that the side sill external panel 23 may accommodate the external side sill external member 21 and the internal side sill external member 22 therein.

Similar to the side sill external panel 23, the side sill internal panel 24 includes a panel portion 24a which is formed substantially in the height direction of the vehicle, and an upper bonding portion 24b and a lower bonding portion 24c which extend to the upper end portion and the lower end portion of the panel portion 24a, respectively. However, since the side sill internal panel 24 has a shape convex inwardly from the vehicle, the panel portion 24a is formed in a shape of protruding inwardly from the vehicle.

The upper portion and the lower portion of the side sill internal panel 24, that is, the upper bonding portion 24b and the lower bonding portion 24c in the side sill internal panel 24 are bonded to the upper bonding portion 23b and the lower bonding portion 23c of the side sill external panel 23, respectively, by welding.

A bulkhead 25 is mounted inside the side sill internal panel 24 to support the inside of the side sill internal panel 24.

According to an exemplary embodiment of the present invention having such a structure, the section thereof may be configured so that the external side sill external member 21 having the W shape and the internal side sill external member 22 having the U shape are mounted inside the side sill 13, improving the strength of the side sill 13.

Figure 14:
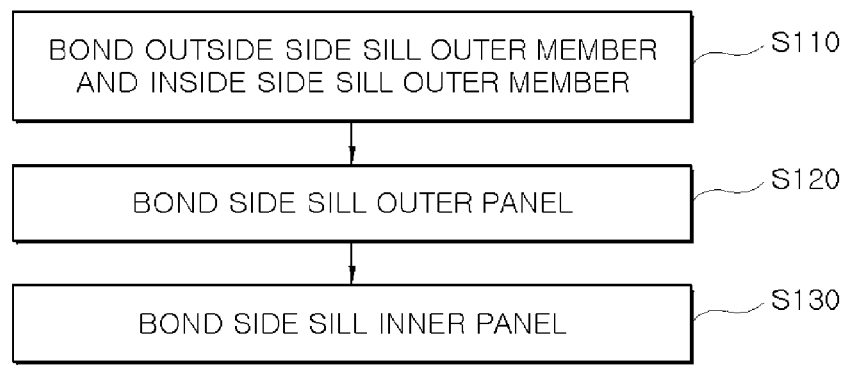
FIG. 14 is a flowchart showing a method of manufacturing the side sill rigidity reinforcement structure of the vehicle according to an exemplary embodiment of the present invention.

A method of manufacturing the side sill rigidity reinforcement structure of the vehicle will be described with reference to FIG. 14 as follows.

Figure 9A:
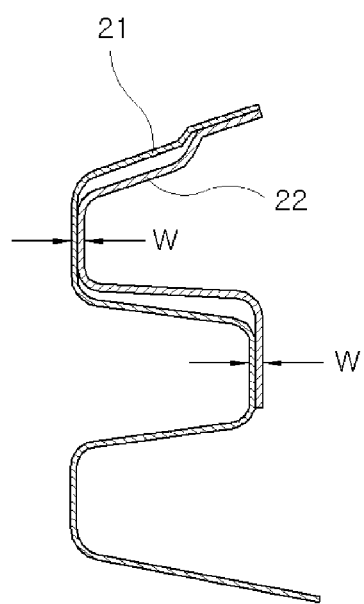
FIG. 9A, FIG. 9B, FIG. 9C, and FIG. 9D are schematic diagrams sequentially showing a welding state for configuring the side sill rigidity reinforcement structure of the vehicle according to an exemplary embodiment of the present invention.
Figure 9B:
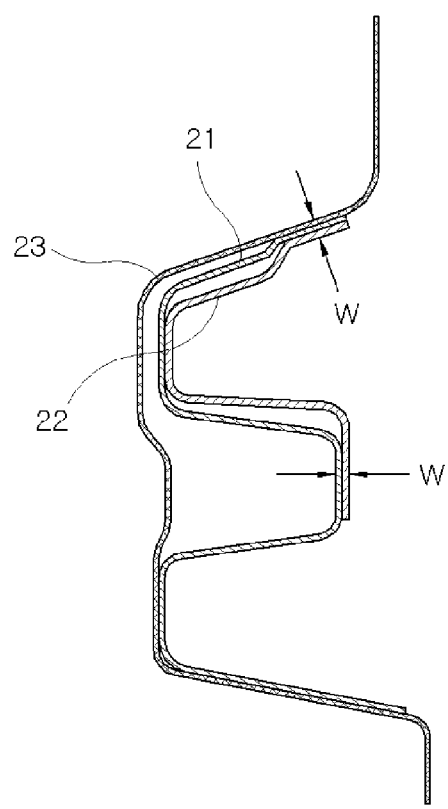

Bonding the side sill external member (S110) bonds the internal side sill external member 22 to the interior of the external side sill external member 21 (see FIG. 9A).

The bonding of the side sill external member (S110) fixes the internal side sill external member 22 inside the upper support portion 21a of the external side sill external member 21, and then bonds the external side sill external member 21 and the internal side sill external member 22 to each other by welding.

The bonding of the side sill external member (S110) welds the upper support portion 21a of the external side sill external member 21 and the reinforcement portion 22a of the internal side sill external member 22, and welds the connecting portion 21c of the external side sill external member 21 and the lower bonding portion 22c of the internal side sill external member 22.

Bonding the side sill external panel (S120) bonds the side sill external panel 23 outside the assembly welded in the bonding of the side sill external member (S110).

The bonding of the side sill external panel (S120) fixes the assembly welded in the bonding of the side sill external member (S110), that is, the assembly of the external side sill external member 21 and the internal side sill external member 22 inside the side sill external panel 23, and then bonds the side sill external panel 23, the external side sill external member 21, and the internal side sill external member 22 by welding.

For example, the bonding of the side sill external panel (S120) may weld the upper bonding portion 23b of the side sill external panel 23, the upper bonding portion 21d of the external side sill external member 21, and the upper bonding portion 22b of the internal side sill external member 22. Furthermore, the bonding of the side sill external panel (S120) may weld the panel portion 23a of the side sill external panel 23 and the lower support portion 21b of the external side sill external member 21.

Figure 9C:
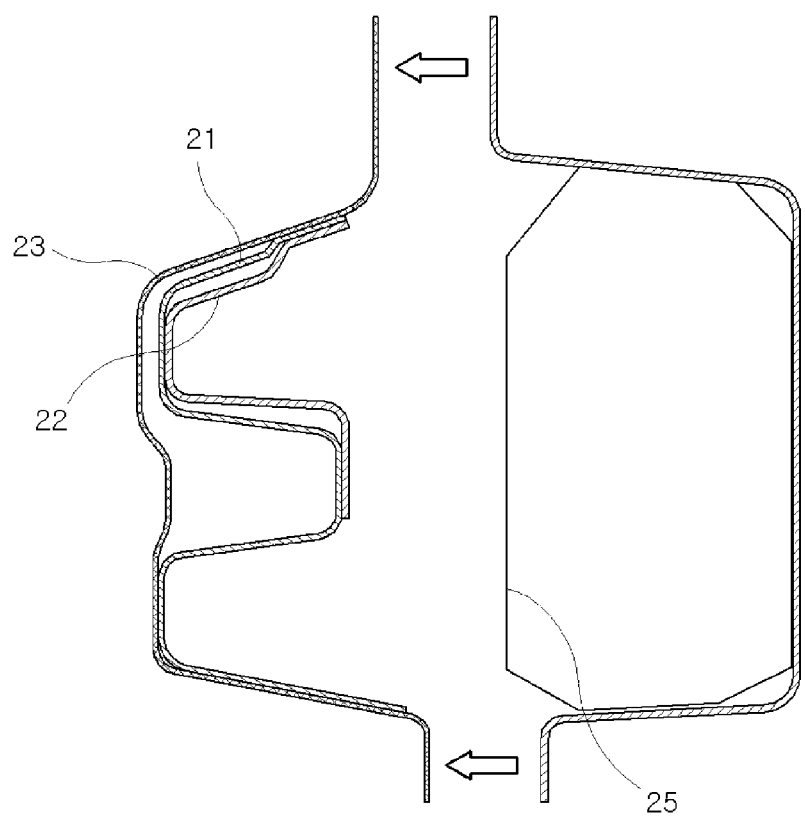
Figure 9D:
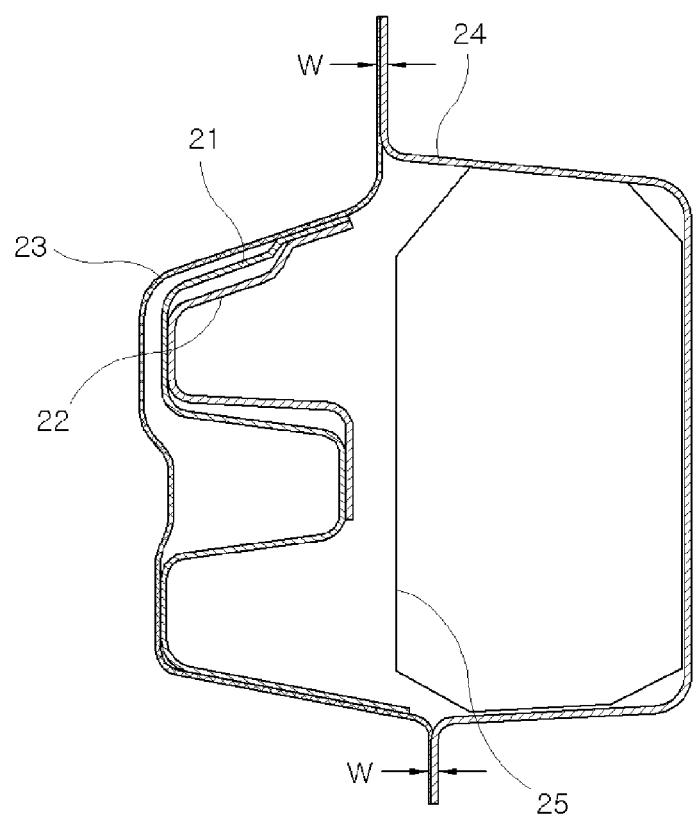

Bonding the side sill internal panel (S130) bonds the side sill internal panel 24, bonded to the bulkhead 25, to the side sill external panel 23. The side sill external panel 23 is in a state where the external side sill external member 21 and the internal side sill external member 22 have been bonded, and the side sill internal panel 24 is in a state where the bulkhead 25 has been bonded thereto (see FIG. 9C). In in the instant state, the side sill external panel 23 and the side sill internal panel 24 are bonded to each other by welding to complete the side sill 13 (see FIG. 9D).

Meanwhile, the side sill rigidity reinforcement structure of the vehicle according to an exemplary embodiment of the present invention allows the side sill 13 of the vehicle to have different strengths in the longitudinal direction of the vehicle.

A site where the side sill 13 is connected to the front pillar 12 of the vehicle, that is, the front of the side sill 13 has a low strength and the side sill 13 has a strength increased toward the rear thereof. Accordingly, by allowing the side sill 13 to be easily buckled at the side collision of the vehicle, collision energy may be consumed in the buckling of the front of the side sill 13, substantially blocking the collision energy from being delivered to the battery (BAT) provided in the vehicle.

Figure 6:
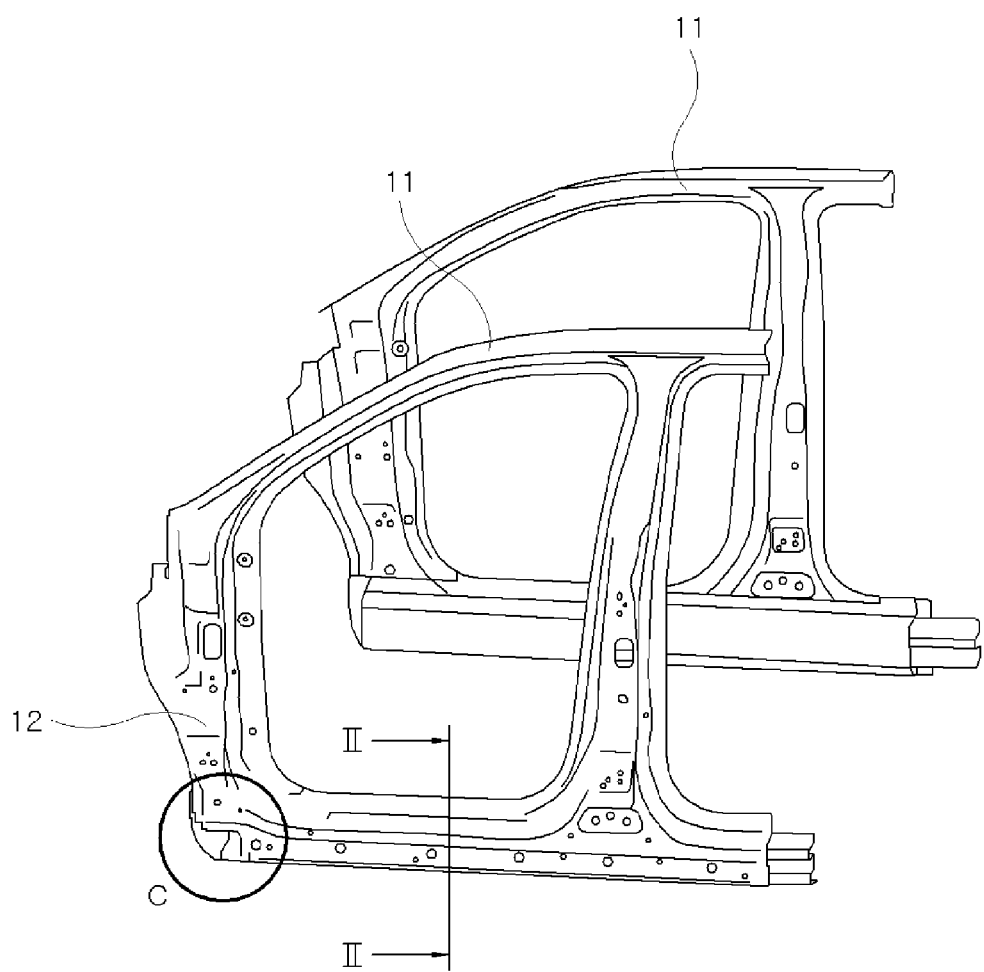
FIG. 6 is a perspective diagram showing an upperbody of a vehicle to which a side sill rigidity reinforcement structure of the vehicle according to an exemplary embodiment of the present invention is applied.
Figure 7A:
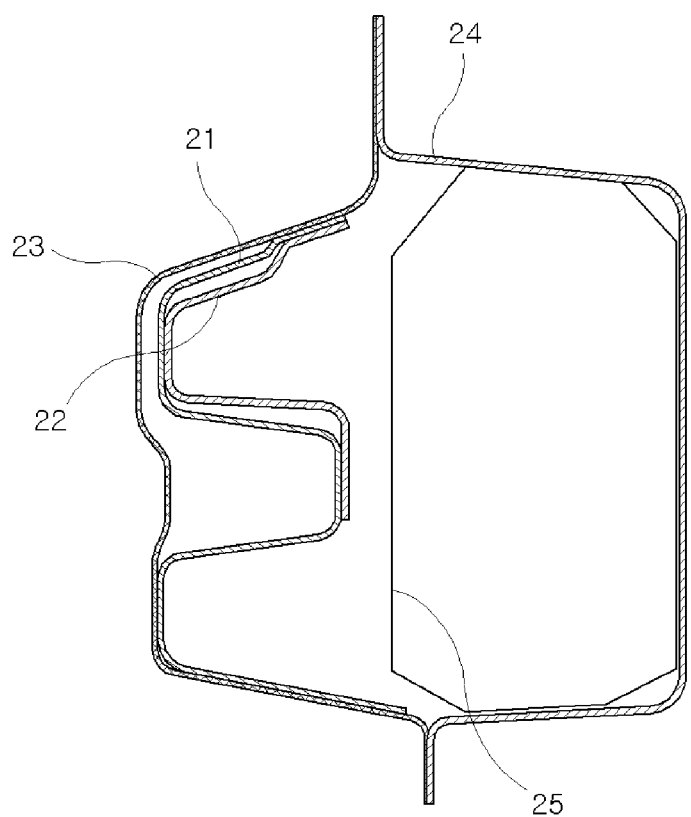
FIG. 7A is a cross-sectional diagram taken along line II-II of FIG. 6.
Figure 8:
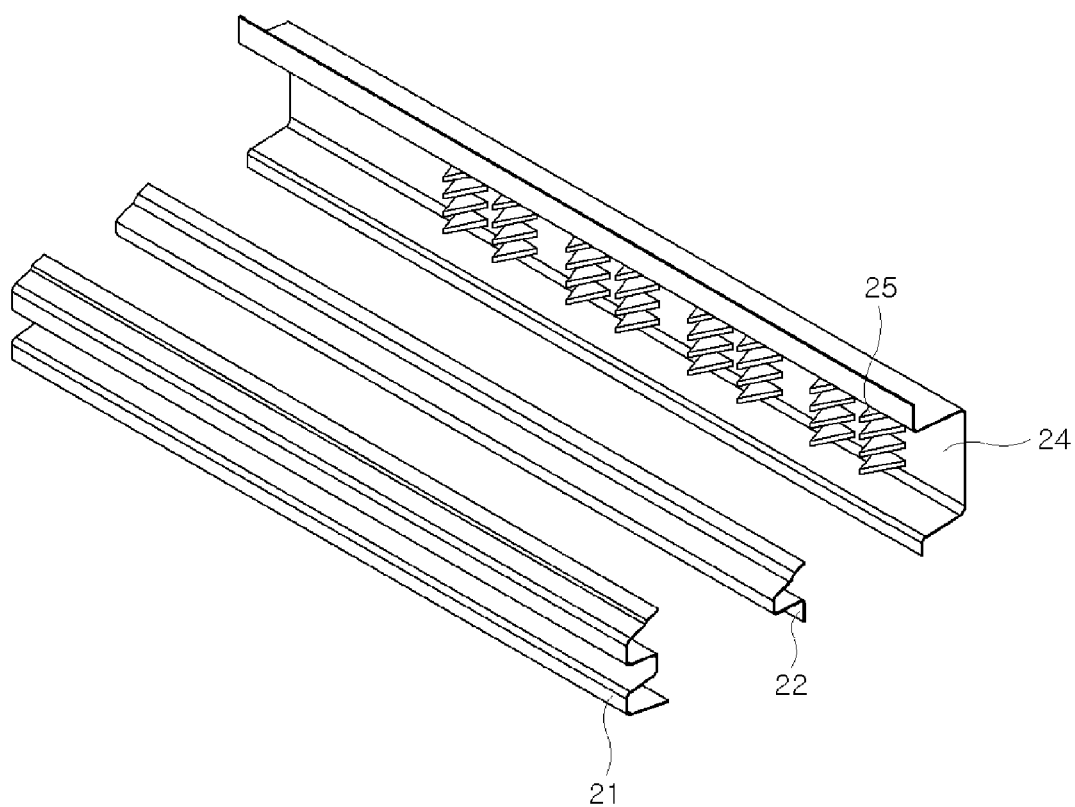
FIG. 8 is a perspective diagram showing a state before an external side sill external member, an internal side sill external member, and a side sill internal panel according to the side sill rigidity reinforcement structure of the vehicle according to an exemplary embodiment of the present invention are fastened.
Figure 10:
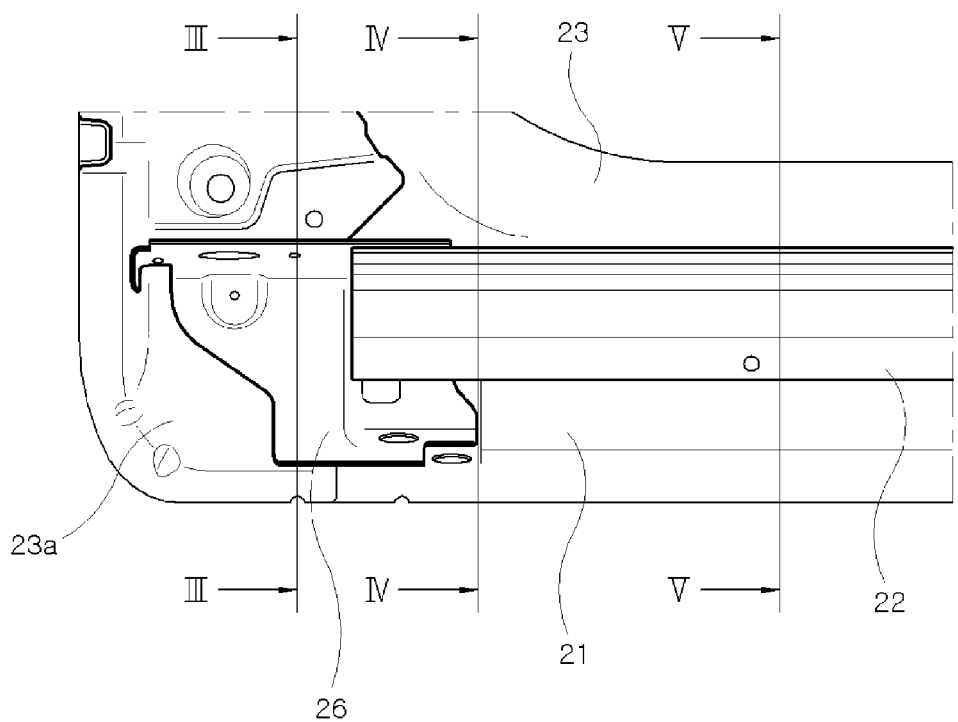
FIG. 10 is a schematic diagram showing a structure of the front of the side sill to which the side sill rigidity reinforcement structure of the vehicle according to an exemplary embodiment of the present invention has been applied.

FIG. 10 shows a site where the front pillar 12 and the side sill 13 of the vehicle are bonded, by enlarging a portion C of FIG. 6. The site where the front pillar 12 and the side sill 13 of the vehicle are bonded may be classified into a first site (site indicated by III-III in FIG. 10), a second site (site indicated by IV-IV in FIG. 10), and a third site (site indicated by V-V in FIG. 10), the first site (III-III), the second site (IV-IV), and the third site (V-V) having cross-sectional structures different from one another. The first site (III-III), the second site (IV-IV), and the third site (V-V) may have different cross-sectional structures, exhibiting the rigidity required at each site.

The first site (III-III) may be a site where the lower end portion of the front pillar 12 and the side sill 13 are bonded, the second site (IV-IV) may be a site located behind the first site (III-III), and the third site (V-V) may be the front of a site having only the side sill 13 while being located behind the second site (IV-IV).

Figure 11:
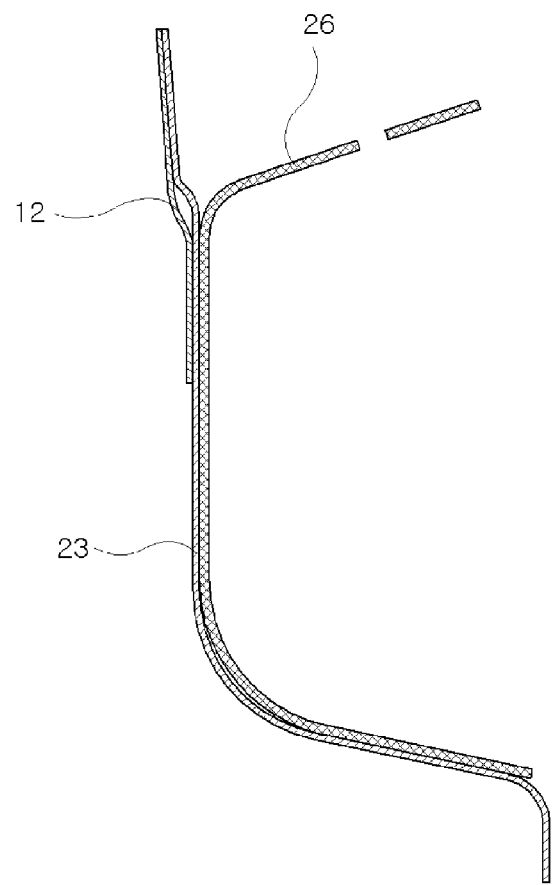
FIG. 11 is a cross-sectional diagram taken along line of FIG. 10.

The first site (III-III) includes a side sill front reinforcement member 26 which is formed at the lower end portion of the front pillar 12 and has the section convexly bent outwardly from the vehicle. The side sill front reinforcement member 26 is a medium which is bonded to the inside of the lower end portion of the front pillar 12 to bond the front pillar 12 to another site, for example, the internal side sill external member 22. As shown in FIG. 11, the first site (III-III) is in a state where the side sill front reinforcement member 26 has been bonded to the inside of the front pillar 12.

The side sill front reinforcement member 26 includes a material softer than that of the external side sill external member 21 or the internal side sill external member 22.

Accordingly, the first site (III-III) is lower in rigidity than the second site (IV-IV) and the third site (V-V).

The second site (IV-IV) is a site where the lower end portion of the front pillar 12 and the side sill 13 contact each other, and is a site where the internal side sill external member 22 is additionally applied to the cross-sectional structure of the first site (III-III).

Figure 12:
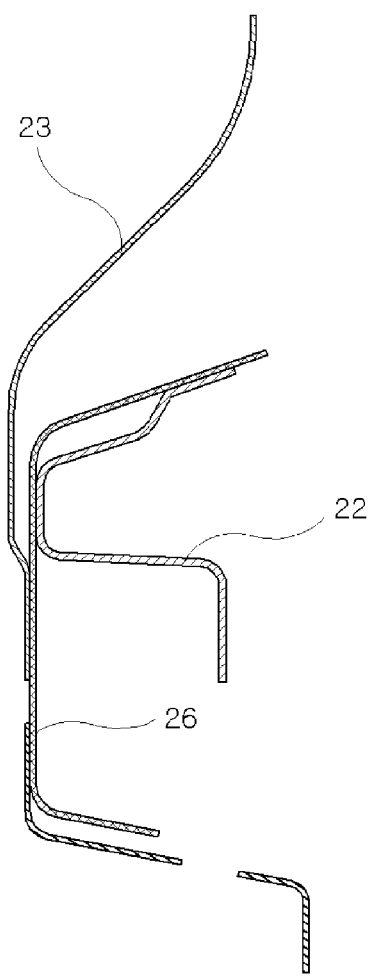
FIG. 12 is a cross-sectional diagram taken along line IV-IV of FIG. 10.
Figure 13:
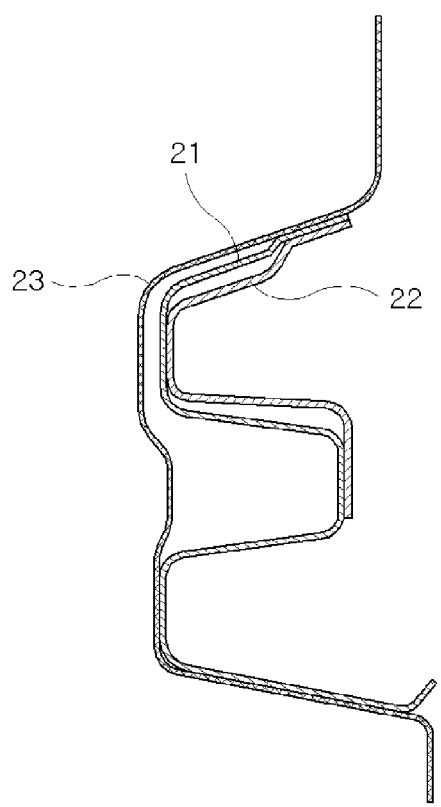
FIG. 13 is a cross-sectional diagram taken along line V-V of FIG. 10.

In the second site (IV-IV), the front end portion of the side sill external panel 23 is bonded to the inside below the front pillar 12, the side sill front reinforcement member 26 is bonded to the inside of the side sill external panel 23, and the internal side sill external member 22 is bonded to the inside of the side sill front reinforcement member 26 (see FIG. 12).

In the second site (IV-IV), the reinforcement portion 22a, which is convexly formed outwardly from the vehicle, in the internal side sill external member 22 is bonded to a site, formed in the height direction of the vehicle, in the side sill front reinforcement member 26. Furthermore, in the second site (IV-IV), the upper bonding portion 22b, which extends upwards from the reinforcement portion 22a, in the internal side sill external member 22 is bonded to the upper portion of the side sill front reinforcement member 26. Accordingly, the internal side sill external member 22 is bonded to the side sill front reinforcement member 26.

Since the second site (IV-IV) is higher in rigidity than the first site (III-III) by adding the internal side sill external member 22, but has no external side sill external member 21, the second site (IV-IV) is lower in rigidity than the third site (V-V).

The third site (V-V) is the middle portion of the side sill 13, and the section of which is the same as the structure (FIGS. 7A to 9D) described above. Since the third site (V-V) has the external side sill external member 21 and the internal side sill external member 22 bonded to the inside of the side sill external panel 23, and the external side sill external member 21 and the internal side sill external member 22 are made of high-rigidity materials, the third site (V-V) is higher in strength than the first site (III-III) and the second site (IV-IV).

Accordingly, at the side collision, the buckling occurs easily in the first site (III-III), and the third site (V-V) is minimized in deformation, preventing the battery, mounted at the lower portion of the vehicle, for example, to the center floor panel or the like, from being damaged.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A side sill rigidity reinforcement structure of a vehicle, the side sill rigidity reinforcement structure comprising:
    an external side sill external member which includes an upper support portion and a lower support portion each having a section convexly formed outwardly from a vehicle and disposed vertically, and formed to connect the upper support portion and the lower support portion;
    an internal side sill external member which is mounted inside one of the upper support portion and the lower support portion;
    a side sill external panel which is bonded outside the external side sill external member; and
    a side sill internal panel which has an upper portion and a lower portion bonded to the side sill external panel.

2. The side sill rigidity reinforcement structure of claim 1, wherein the external side sill external member further includes a connecting portion which connects the upper support portion and the lower support portion and is convexly formed inwardly from the vehicle.

3. The side sill rigidity reinforcement structure of claim 2, wherein the internal side sill external member includes:
a reinforcement portion which is convexly formed outwardly from the vehicle and bonded to the upper support portion,
a lower bonding portion which extends downwardly from the reinforcement portion and is bonded to the connecting portion, and
an upper bonding portion which extends upwards from the reinforcement portion and is bonded to the external side sill external member and the side sill external panel.

4. The side sill rigidity reinforcement structure of claim 2, wherein a site, bonded to the connecting portion, in the internal side sill external member extends vertically, and covers the connecting portion.

5. The side sill rigidity reinforcement structure of claim 1, wherein the internal side sill external member is made of a material having a tensile strength lower than a tensile strength of the external side sill external member, and
wherein the external side sill external member and the internal side sill external member are manufactured by roll forming.

6. The side sill rigidity reinforcement structure of claim 1, wherein a bulkhead which supports the side sill internal panel, is bonded to an inside of the side sill internal panel.

7. The side sill rigidity reinforcement structure of claim 1, wherein the internal side sill external member is formed longer than the external side sill external member, and
wherein a front end portion of the internal side sill external member is located closer to a front of the vehicle than a front end portion of the external side sill external member.

8. The side sill rigidity reinforcement structure of claim 7, wherein the internal side sill external member is bonded to the external side sill external member behind a site extending downwardly from a front pillar of the vehicle.

9. The side sill rigidity reinforcement structure of claim 7, wherein the front end portion of the internal side sill external member is located at substantially a same site as a front end portion of the side sill external panel, and
wherein the front end portion of the internal side sill external member is located to be spaced from a front end portion of a front pillar of the vehicle.

10. A side sill rigidity reinforcement structure of a vehicle, which reinforces a rigidity of a side sill disposed in a longitudinal direction of the vehicle below a side surface of the vehicle,
wherein the side sill has a strength which becomes higher from a front of the vehicle toward a rear of the vehicle,
wherein a first site where a lower end portion of a front pillar and the side sill are bonded, a second site which is located behind the first site, and a third site which is located behind the second site and forms the side sill are formed sequentially in the longitudinal direction of the vehicle,
wherein the first site, the second site, and the third site have different sectional structures to have predetermined rigidity, and
wherein the strength increases from the first site toward the third site.

11. The side sill rigidity reinforcement structure of claim 10,
wherein the first site has a side sill front reinforcement member which is formed at the lower end portion of the front pillar and has a section convexly bent outwardly from the vehicle.

12. The side sill rigidity reinforcement structure of claim 11, wherein the second site has:
a front end portion of a side sill external panel bonded to an inside below the front pillar,
a side sill front reinforcement member bonded to an inside of the side sill external panel, and
an internal side sill external member bonded to an inside of the side sill front reinforcement member.

13. The side sill rigidity reinforcement structure of claim 12, wherein the internal side sill external member includes:
a reinforcement portion which is convexly formed outwardly from the vehicle in the internal side sill external member and is bonded to a site, formed in a height direction of the vehicle, in the side sill front reinforcement member, and
an upper bonding portion which extends upwards from the reinforcement portion in the internal side sill external member and is bonded to an upper portion of the side sill front reinforcement member.

14. The side sill rigidity reinforcement structure of claim 12,
wherein the third site has an external side sill external member which is bonded to the inside of the side sill external panel for forming an appearance of the side sill, and the internal side sill external member which contacts with an inside of the external side sill external member.

15. The side sill rigidity reinforcement structure of claim 14, wherein the external side sill external member includes:
an upper support portion and a lower support portion which each have a section convexly formed outwardly from the vehicle, and disposed vertically, and
a connecting portion which connects the upper support portion and the lower support portion and is convexly formed inwardly from the vehicle.

16. The side sill rigidity reinforcement structure of claim 15, wherein the internal side sill external member includes:
a reinforcement portion which is convexly formed outwardly from the vehicle and bonded to the upper support portion, and
a lower bonding portion which extends downwardly from the reinforcement portion and is bonded to the connecting portion.

17. The side sill rigidity reinforcement structure of claim 15,
wherein a rear end portion of the side sill front reinforcement member is located at a same location as a front end portion of the external side sill external member.

* * * * *